United States Patent
Lindner et al.

[11] Patent Number: 5,924,180
[45] Date of Patent: Jul. 20, 1999

[54] TRANSPORT DEVICE AND ASSOCIATED GUIDING RAIL

[75] Inventors: Paul Lindner, Henndorf, Austria; Ulrich Rühlemann, Grabenstätt, Germany

[73] Assignee: Bruckner Maschinenbau GmbH, Siegsdorf, Germany

[21] Appl. No.: 08/750,506

[22] PCT Filed: Apr. 23, 1996

[86] PCT No.: PCT/EP96/01696

§ 371 Date: Dec. 11, 1996

§ 102(e) Date: Dec. 11, 1996

[87] PCT Pub. No.: WO96/33858

PCT Pub. Date: Oct. 31, 1996

[30] Foreign Application Priority Data

Apr. 24, 1995 [DE] Germany ............................ 195 15 036

[51] Int. Cl.$^6$ ................................................ D06C 3/04
[52] U.S. Cl. ........................................ 26/89; 26/93; 26/72
[58] Field of Search ............................... 26/87, 88, 89, 26/91, 93, 72, 73

[56] References Cited

U.S. PATENT DOCUMENTS

| | | | |
|---|---|---|---|
| 3,457,608 | 7/1969 | Gageur | 26/93 |
| 4,080,692 | 3/1978 | Parrillo et al. | 26/91 |
| 4,602,407 | 7/1986 | Gresens | 26/89 |
| 4,736,498 | 4/1988 | Langer et al. | 26/91 |
| 4,879,788 | 11/1989 | Suzuki et al. | 26/94 |
| 5,072,493 | 12/1991 | Hommes et al. | 26/72 |
| 5,613,284 | 3/1997 | Hosmer | 26/89 |
| 5,768,755 | 6/1998 | Hemmerich | 26/89 |

FOREIGN PATENT DOCUMENTS

| | | |
|---|---|---|
| 156311 | 1/1968 | France . |
| 1925284 | 5/1969 | Germany . |
| 2360335 | 12/1973 | Germany . |
| 2536407 | 8/1975 | Germany . |
| 2605510 | 8/1977 | Germany ............... 26/89 |
| 3333938 | 9/1983 | Germany . |
| 374158 | 12/1987 | Germany . |
| 1136709 | 6/1967 | United Kingdom . |
| WO 91/12952 | 9/1991 | WIPO . |

*Primary Examiner*—Amy Vanatta
*Attorney, Agent, or Firm*—Nixon & Vanderhye

[57] ABSTRACT

An improved transport device comprises a novel guide rail (3). Carriages (5) can be moved along the guide rail (3), which carriages comprise guide elements (25a, 25b; 25c, 25d) for this purpose, which elements are supported on rail guiding surfaces (17a, 17b; 17c, 17d) of the guide rail (3). The guide rail is held in a prestressed and/or damped manner with variable guide elements (25a, 25b; 25c, 25d) comprising, for example, sliding pieces or running rollers at the respective spacing of the [sic]. As a result, the spacing distance between the rail guiding surfaces (17a, 17b; 17c, 17d) can automatically be adjusted to the variable, in each case given, spacing of the guide elements (25a, 25b; 25c, 25d).

21 Claims, 8 Drawing Sheets

TRANSPORT DEVICE AND ASSOCIATED GUIDING RAIL

The invention relates to a transport device, in particular for a moving material web, preferably a stretching system and to an associated guide rail.

Both transverse stretching systems, longitudinal stretching systems and also simultaneous stretching systems are known, in particular, in the production of plastic films. In the case of the latter simultaneous stretching systems, the plastic film web is stretched simultaneously in the longitudinal and transverse directions. The material web is in this case grasped on the opposite outer edges by a multiplicity of so-called tenters or tenter elements, which can be moved in a circulating manner along two rails arrangements provided at the side of the material web, by means of which arrangements the plastic film web is stretched.

A device for the simultaneous biaxial stretching of a moving material web has been disclosed, for example, by DE-C2-37 41 582. A device for the transverse stretching and fixing of film webs is disclosed, on the other hand, by WO 91/12952, for example.

In transport devices of this kind, a rail arrangement is used having at least one guide rail on which the individual tenters or tenter carriages are as a rule guided over a plurality of running rollers, such that the individual tenter carriages cannot lift off from the one or more guide rails. In other words, the individual tenters or tenter carriages are guided on all sides, or at least on three sides, on at least one guide rail such that they are protected by the running rollers mounted on the tenter element. As an alternative to the use of running rollers, it is also known in principle from DE-A1-33 33 938 to support a tenter chain by means of, for example, three slideway which are fixed in terms of position and are offset with respect to one another.

The guide surfaces which are each aligned with an oppositely directed component, i.e. which are formed on opposite sides of the guide rails, essentially correspond to the clear spacing between the running rollers or sliding pieces which can be moved thereon. However, it must be ensured that there is always sufficient play between the running rollers or sliding pieces, also referred to generally below as guide elements, and the running or sliding surfaces interacting therewith of the rails, since only in this way are manufacturing tolerances and unavoidable changes in geometry in curved pieces accommodated without distortion of the guide elements.

During a circulating movement of a tenter, owing to its nature, changing external loads (dynamic forces, film forces in the longitudinal and transverse directions, propulsion forces, etc.) occur, which loads alternately press the various guide elements (i.e., for example, running rollers or sliding pieces) onto the guide rail. The dynamic forces, in particular, rise with the ever increasing speed of the system.

At relatively high speeds, for example from 200 m/min upwards, the guide elements, in particular the running rollers, are subject to high impact stress, since even with the slightest play they repeatedly alternately come into contact with and lift off from the running surfaces on the rails. Running rollers which are temporarily not loaded come to a standstill and, when the situation changes over, that is to say when they come into contact again with the associated running surface, the unloaded running rollers are subjected to high acceleration in an extremely short time. This interaction and the associated impact stress considerably reduces the service life of the guide elements, i.e. in particular of the running rollers. At the same time, the guide rails at these points are subject to considerable wear.

Due to these facts, attempts are continuously being made to keep the necessarily required play between guide elements and rail guide sections as small as possible. However, it has to be borne in mind that particles, e.g. small pieces of film (in particular if the plastic film web tears) may penetrate into this guide rail system at any time, and thus will inevitably have to be passed over. However, as the play becomes ever smaller, high spreading forces may build up between the rail guide section and the guide elements which can be moved along it. In extreme cases, this may lead to the transport system becoming blocked and result in damage to the components.

From this position, the object of the present invention is to provide a system which is improved in comparison, in order to reduce the stress on the guide rail system, including the guide elements, and thus to increase the functional efficiency and service life of the entire system.

Now, according to the invention it is envisaged that a rail arrangement is used having at least one rail, the at least two running or sliding surfaces of which, aligned with opposite components, are at least slightly changeable in terms of spacing with respect to one another. Preferably, these two running or sliding surfaces (also referred to below as rail guiding surfaces) are prestressed and/or damped by a prestressing and/or damping device, such that the guide elements, which can be moved along them, of the tenter or of the tenter carriage are kept in continuous contact with the rail guiding surfaces interacting therewith.

In order that the guide elements continuously bear on the rail, i.e. on the rail guiding surfaces, with at least a slight pressure, the rail arrangement comprises a movably mounted rail guide element on at least one side of the rail. This rail guide element is always kept at least slightly prestressed on the guide element(s) interacting therewith of the tenter carriage by means of the preferably provided prestressing elements. However, due to the reaction forces between the prestressing elements and the respective guide rail element, the running rollers provided, for example, on the opposite side of the guide rail are also brought to bear and thus kept moving. The initially described disadvantages of the so-called changeover, during which, for example, running rollers which are temporarily not subjected to load come to a standstill and are subjected to high acceleration again in an extremely short time during the changeover, are reliably avoided, as are the associated disadvantages.

The solution according to the invention provides a number of advantages:

Due to the possibility according to the invention of adapting a prestressed guide rail for a play-free contact of the guide elements, it is possible to compensate for manufacturing tolerances between the guide elements held on the tenters and the rail(s) without problems.

In addition, permanent contact between the running rollers or sliding pieces of the tenter carriage and the running or sliding surfaces of the rail is ensured. In the process, the running rollers are, for example, continuously rotated with a defined force at the circumferential speed which is dependent on the speed of movement of the tenter carriage.

Finally, a damping action is achieved, so that dynamic shocks, impacts, accelerations or vibrations are reduced or avoided. However, even if damping devices are used alone (without prestressing devices), it is also possible to achieve significant advantages compared with conventional solutions.

In the event of additional loading, for example when passing over foreign bodies, spring deflection and deviation of the prestressed guide rail elements is ensured without any problems.

Furthermore, controlled prestressing, which can be adjusted to the particular loading, of the rail or of the correspondingly prestressed rail elements is possible.

Although a solution for providing continuous contact of the running rollers with the corresponding running rail surfaces is known in principle from WO 91/12952, this document envisages that at least one running roller per tenter is slightly adaptably adjusted transversely with respect to the running surface of the rail by means of the tensile forces. This principle is not only completely different from the present invention, but above all is also only possible in so-called transverse stretching plastic web systems, since in this case the individual tenter carriages are fastened securely to one another in the manner of a tenter chain. Naturally, this principle cannot be employed for simultaneous transport systems having scissor chains or also freely driven individual tenters (for example by means of spindles or linear motors, as is disclosed in principle, inter alia, by US-A1-5,072,493).

Finally, DE-B2-19 25 284 furthermore also discloses a tenter chain for tenter clips in tenter frames. In the case of a tenter chain of this kind (which, owing to its nature, is suitable, for example, only for a transverse stretching system and not for a longitudinal or simultaneous stretching system), the individual tenter clips are in each case supported on a guide rail via an upper running roller which rotates about a horizontal pin. However, since it is possible for the running rollers bearing the weight of the tenters and the chain to jump vertically at high running speeds of the tenter chain, it is envisaged that, at intervals, individual ones of these running rollers be mounted at a higher level and be supported on a second rail situated above. This second rail is mounted resiliently. This proposal, too, relates only to a very specific application of a tenter chain. These tenter elements are in this case not supported on the guide rail by their own running roller, as a result of which instability may arise.

Finally, DE-A1-25 36 407 has disclosed a bridging device for the gap in guide rails of a device for laterally stretching web-shaped material, which document reveals that two running rollers rotate in an axially offset manner on a common spindle. While one running roller bears and rolls on a guide rail guiding surface assigned to it, the second running roller, which is positioned axially offset with respect thereto, is supported on a guiding surface of a second guide rail, which is of L-shaped design in cross-section and is resiliently mounted, which guiding surface is opposite the first guide rail. This is also a specific solution, in which a double roller is supported on two opposite guiding surfaces of two separate guide rails (thus not on a single guide rail, also referred to as monorail). However, this solution has the further disadvantage that, as a result of the two running rollers being supported oppositely and offset in the axial direction on the two different guide rails, forces are introduced asymmettrically onto the tenter carriage, which is extremely undesirable. This asymmetric introduction of forces generates undesired moments, which lead to additional loads on the guide elements.

By contrast, it is provided according to the invention that, even if a plurality of guide rails were to be provided, a corresponding carriage, in particular a tenter carriage, is supported on a single guide rail, specifically on the so called monorail, so as to engage over the latter. As a result, no undesirable asymmetric introduction of forces and tilting moments are formed, unlike the prior art just mentioned. In this case, the prestressing and/or damping device according to the invention is designed on this single guide rail, also to be referred to as monorail. In particular, in contrast to the prior publication just mentioned, this arrangement also provides, above all, a transport device for high and extremely high transport speeds. The design according to the invention of the single guide rail, which as a rule has a rectangular cross section, also makes it possible for these so-called monorails to be composed, for example, of long metal strips, which are flexible and thus permit a jolt-free rail even at the movable joints. The at least slight fluctuations in thickness occurring in the opposite running surfaces on a single guide rail of this kind, over or around which the carriage engages, can be compensated by the prestressing and damping devices formed on this rail. As a result, the invention also provides the possibility of integrating an anti-vibration system in a monorail of this kind when little space is available.

In a particularly preferred embodiment of the invention, only one of, for example, two opposite rail running surfaces is arranged to be slightly movable by means of the prestressing and/or damping device provided according to the invention. The other running rail is arranged fixed with respect to the actual rail body or rail support. In a refinement of the invention, however, it is also possible for in each case two or more rail guide sections, aligned in opposite directions, to be at least slightly adjustable and to be adaptable to the spacing distance of the guide elements provided on the tenter body.

Various design principles may be used as prestressing or biasing. Springs of any kind, for example leaf springs, coil springs, disk springs, flexible limb springs, torsion springs, zigzag springs, etc., are, for example, suitable. It is also possible to use multiple-component spring devices.

The damping devices mentioned may be additionally provided. Preferably, combined spring/damping elements may also be used, which not only produce self-adjustment of the contact surfaces on the rails with respect to the guide elements on the tenter carriages, but in addition also effect an additional damping. As damper elements, consideration may be given, for example, to elastomer springs or dampers, gas pressure springs or dampers, hydraulic spring or damper systems. Finally, it has proven favorable to limit the range of adaptability of the at least one contact surface, i.e. of at least one automatically adjustable rail guide element, by means of inner and outer stops.

In a particularly preferred embodiment of the invention, the variable-position rail guiding surfaces and the rail guide elements held in a prestressed and/or damped manner, respectively, are provided on a so-called monorail, that is to say on a single rail. In this case, the corresponding devices may be used not only in the vertical direction, but also in the horizontal direction, in which, for example, the film tensile forces act. Finally, the individual rail guide elements, which are held in a prestressed manner, may in each case simultaneously serve to support a running roller, which rotates about, for example, a horizontal and a vertical axis.

The invention is explained below with reference to drawings for various exemplary embodiments. In the drawings.

Figure 1:
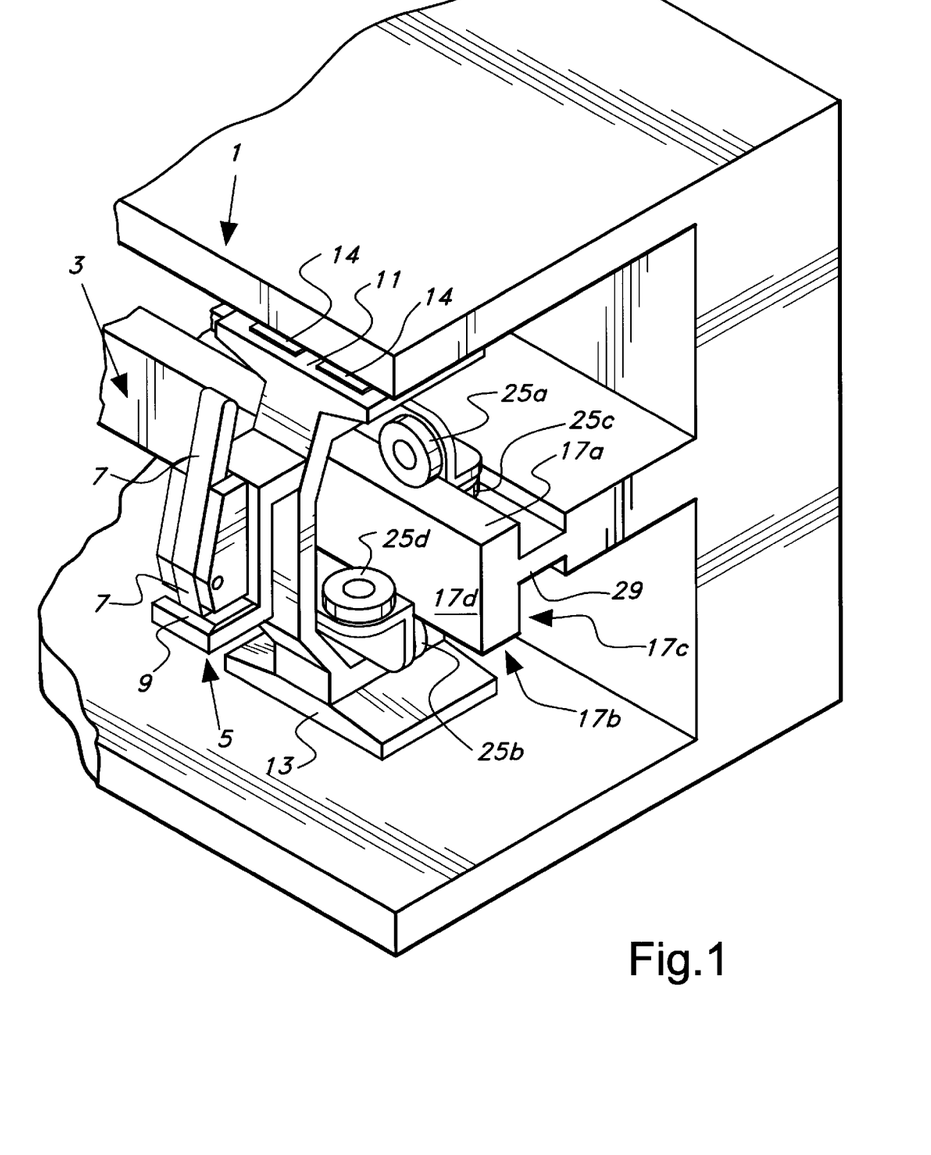
FIG. 1: shows a diagrammatic perspective representation of an excerpt of a tenter carriage which can be moved along a guide rail according to the invention.
Figure 2:
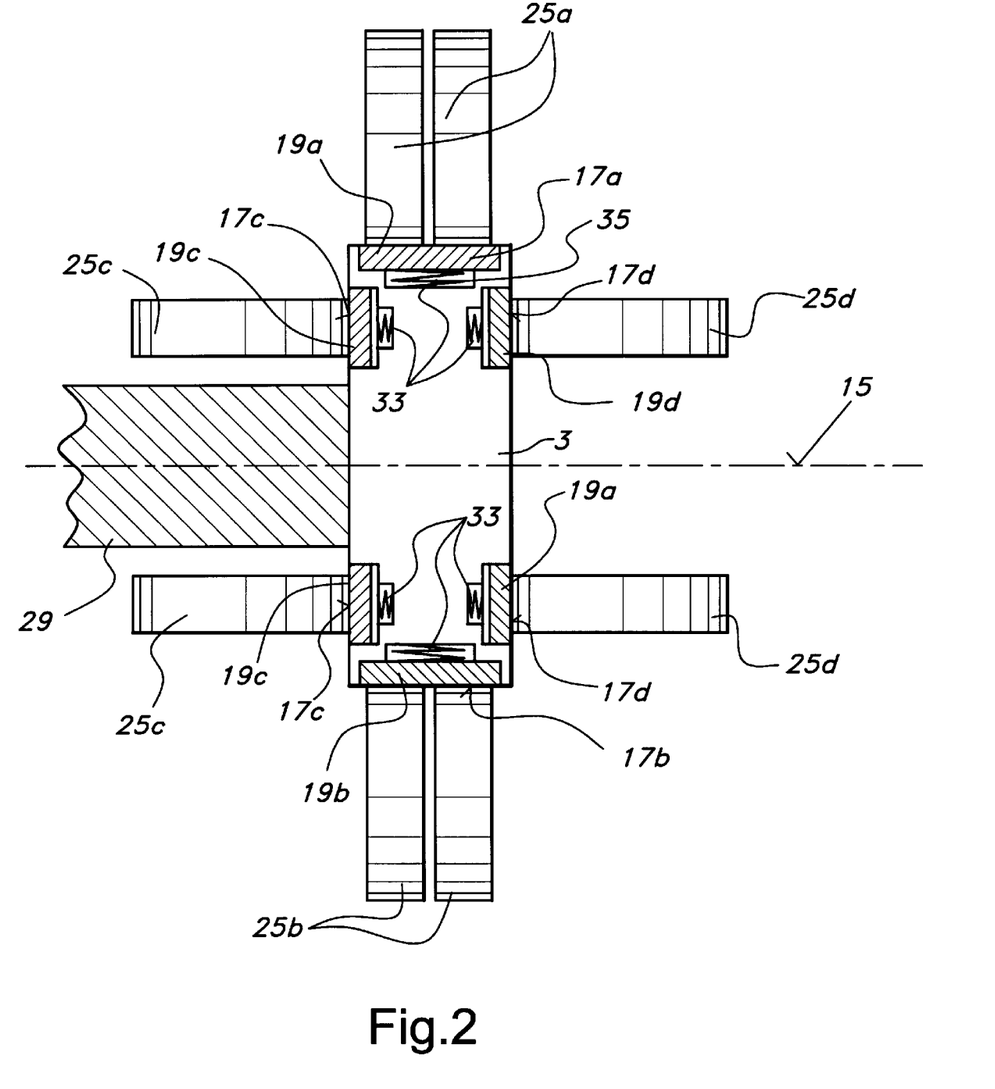
FIG. 2: shows a diagrammatic cross-sectional representation of an excerpt of a guide rail according to the invention.

FIG. 1 shows an excerpt of a guide rail arrangement 1 with a guide rail 3 of rectangular cross-section, along which rail tenters or tenter carriages 5 can move. In this case, it is a so-called single rail, also referred to as monorail, on which the carriage is supported and can be moved such that it engages over or around this single rail. In a monorail of this kind, depicted in FIGS. 1 and 2, therefore, the corresponding rail guiding surfaces face outward. The cross-sectional arrangement of the guide rail in accordance with FIGS. 1 and 2 is, in this case, essentially rectangular, it being possible for the guide rail itself to be composed of a plurality of layered strips, which in addition may be flexible, in order thus to be able to employ a jerk-free rail even at rail transitions with movable joints.

In the case of a stretching system, it is known to provide a guide rail 3 of this kind to the left and to the right of the material web, which guide rail is part of a closed circulating guide rail track, along which the tenter carriages 5 circulate. It is known in this case to grip the edge of the film web to be stretched between a pivotable tenter lever 7 and a tenter table 9, and then to move the edge forward, the guide rail order [sic] 1 being arranged on both sides of the moving material web, symmetrically to one another.

The tenter carriages 5 may be driven, for example, by means of linear motors, as is known in principle for the case of a simultaneous stretching system from U.S. Pat. No. 5,072,493, to the disclosure content of which reference is made to this extent. To this end, magnets 14 having different vertical polar orientation are provided on the top and bottom sides 11 and 13, respectively, of the tenter, which magnets interact with linear motors which are situated adjacently at the top and bottom and are not drawn in detail in FIG. 1.

As can be seen from FIG. 2, the guide rail 3 comprises, relative to a material web plane 15, which is usually horizontally aligned, upper and lower running surfaces, one of which is provided on the material strip side and one on the opposite side to this, which running surfaces are also referred to below in general as rail guiding surfaces.

In the exemplary embodiment shown, top running members, preferabley rollers 25a, which are situated offset in the longitudinal direction of the guide rail 3, run on the top, horizontally aligned guide rail surfaces 17a, and, oppositely thereto, running rollers 25b, which are likewise situated correspondingly offset in the longitudinal direction on the tenter carriage, run on the guiding surface 17b facing downward. The corresponding axes with regard to the running rollers are depicted in FIG. 2 only in dot-dash lines. The tenter element depicted in FIG. 1 is not shown in FIG. 2, for the sake of clearer representation.

A conventional rail support 29, on which the guide rail 3 may be fastened, for example, by means of screws (not shown in more detail), is, for example, provided offset in the longitudinal direction of the guide rail 3.

In each case above and below these rail supports 29, there are formed on the guide rail 3, on the side remote from the material web, vertically aligned running surfaces 17c, and, on the opposite side, that is to say on the material web side, further running surfaces 17d, on which surfaces running rollers 25c and 25d, respectively, roll, which rollers are likewise mounted on the tenter carriage 5.

The spacing between the respectively opposite running rollers, i.e. the top and bottom running rollers 25a and 25b and the running rollers, situated on the left and on the right, 25c and 25d, respectively, is in each case adapted to the vertical or horizontal spacing between the guiding surfaces 17a and 17b or 17c and 17d, respectively.

In order to be able to ensure continuous contact of the running rollers with the associated running surface, it is envisaged in the case of the exemplary embodiment in accordance with FIGS. 1 and 2 that the running surfaces, i.e. therefore the rail guiding surfaces 17a to 17d, be in each case formed on the side facing outward of separate rail guide elements 19a to 19d, which are in each case held at least slightly prestressed in the direction of the associated running rollers 25a to 25d by means of a prestressing and/or damping device 31.

Spring devices 33 provided for this purpose are depicted diagrammatically in FIG. 2. On the side of the rail body, they are supported lying in receiving depressions 35, and automatically press the rail guiding surface elements 17a to 17d in the direction of the running rollers 15a to 15d.

Usually, the arrangement is such that the at least slightly adjustable and prestressed rail guiding surface elements can be moved, in a manner which is limited by stops, between a maximum adjustment movement in the direction of the spring force of the prestressing device 31 (i.e. outward), but also in the reverse direction, counter to the force of the prestressing device 31 (i.e. inward), in a manner limited by stops. The adjustment range only has to be large enough for it always to be possible to compensate for play, which is usually provided of necessity, between running rollers and guide rails in order to overcome tolerance errors.

In the exemplary embodiment in accordance with FIGS. 1 to 2, a separate sprung roller rail, that is to say a sprung rail guide element, is provided for each track. However, it is also possible to combine a plurality of roller rails to form one functional unit.

In many applications, the tenter carriages are supported, inter alia by their own weight, primarily by means of the top running rollers 25a, so that it is not absolutely necessary to provide a corresponding prestressing and/or damping device 31 for these rollers.

A modified exemplary embodiment is shown below with reference to FIG. 3, in which embodiment a guide rail with a variable external dimension, which adjusts itself automatically to the respective spacing of the guide elements, is provided only in one plane, specifically here in a main functional plane, in which the film forces act.

Figure 3:
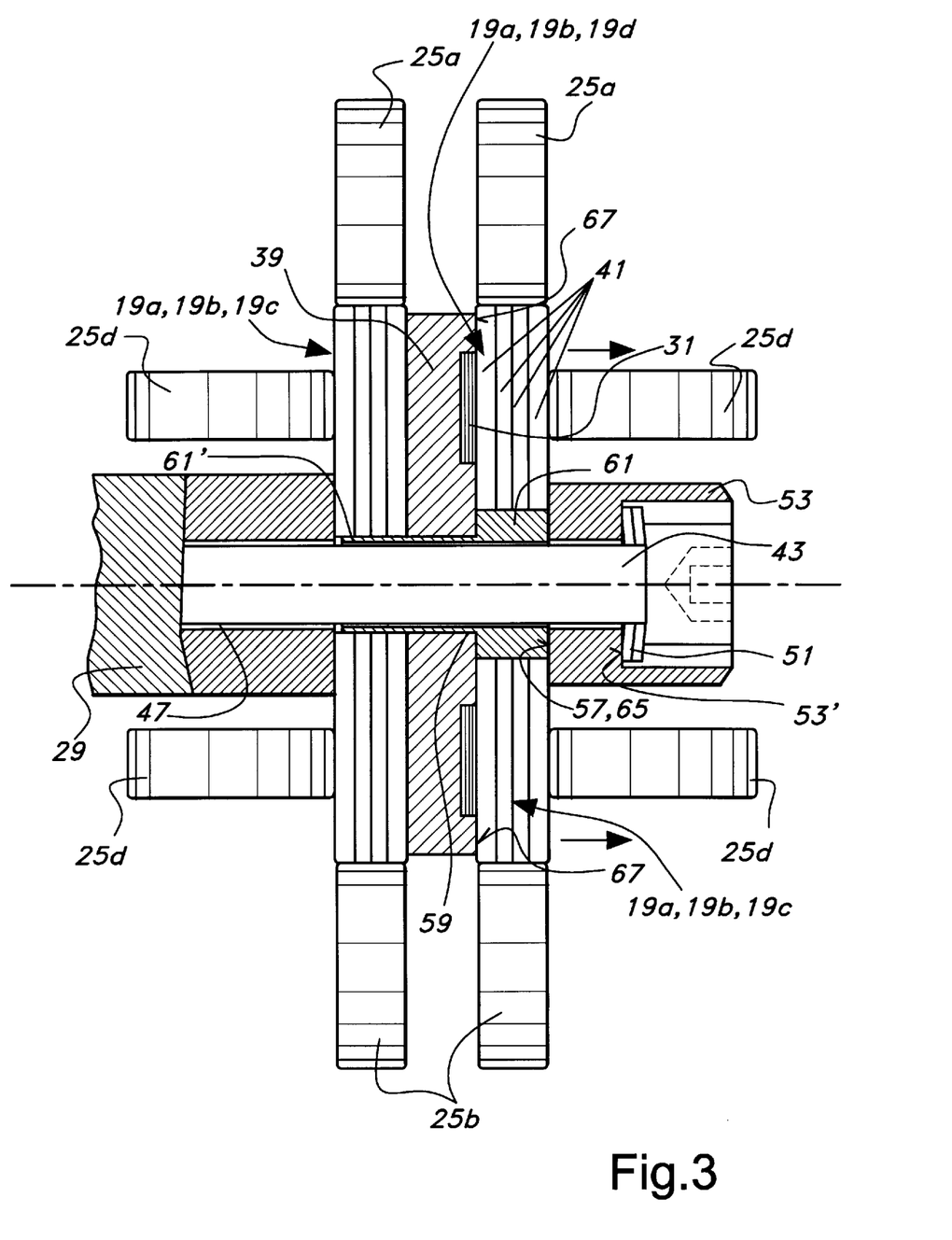
FIG. 3: shows a simplified embodiment, in which only one running surface, which runs transversely with respect to the plane of the film, is sprung and/or damped.

It is shown with reference to the enlarged detailed representation in accordance with FIG. 3 that the guide rail 3 comprises a guide rail core 39, on which guide rail strips 41 are mounted one on top of the other, in a sandwich construction, on the material web side and on the rail support side.

Fastening is carried out by means of screws 43, which are situated offset in the longitudinal direction of the guide rails and are screwed, through a central bore through the guide rail and guide rail strips, into a corresponding threaded bore 47 in the rail support 29.

The clamping forces are transmitted from the head of the screw 43, via washerlike disk springs 51 which generate prestressing forces, to an outer bush 53 or a conventional outer clamping body 53 which runs parallel to the guide rail. The clamping forces are in this case supported, via the disk springs 51, on respectively provided shoulders 53' of the outer clamping support 53.

The clamping forces then act, via the rail-side bearing surface 57 of the outer clamping support 53, on the inner bushes 59 through which the screws 43 pass.

The inner bushes 59 have an outer, thickened clamping section 61, which then merges into a narrowed sleeve section 61' on the rail support side.

The axial length of the sleeve section 71', which is provided with a reduced external diameter compared to the thickened clamping section 61, is smaller than the sum of the thickness of the guide rail core 39 and the guide rail strips 41 situated on the support side, so that, when the screws 43 are screwed tight, the guide rail core 39 and the guide rail strips 41 situated on the rail support side are screwed tight to the rail support 29 via the thickened clamping section 61, so that the rail-support side rail guide elements 19c can provide a precise guidance for the tenter carriages 5.

Now, the axial length of the thickened clamping section 61 of the inner bush 59 is dimensioned such that the clamping section 61 is at least slightly larger than the thickness of the guide rail strips 41 situated on the material web side. The difference of the thickness between the guide rail strips 41 situated on the material web side and the axial length of the thickened clamping section 61 defines a travel H, by which the position of the rail guide elements 19d, which in the exemplary embodiment shown are situated on the material web side and are formed by guide rail strips 41, can be adjusted.

Since the rail guide elements 19d, formed by guide rail strips 41, cover the prestressing and/or damping devices 31, a so-called inner-side stop 67 is formed by the rail guide elements 19d bearing on the adjoining wall of the guide rail core 39 and a so-called outer stop 65 is formed by the bearing side 57 of the outer clamping support, which stop limits the adjustment range of the rail guide elements 19d.

Finally, it can also be seen from FIG. 3 that the guide rail strips 41 simultaneously form the horizontally aligned rail guiding surfaces 17c and 17d, as well as also the further rail guiding surfaces 17a and 17b facing upward and downward. To this end, the guide rail strips 41, which are aligned transversely with respect to the material web, thus in the vertical direction, and are arranged next to one another in the horizontal direction, project above the top side of the guide rail core 39.

As has already been explained with reference to FIGS. 1 and 2, in this case the material-web side guide rail elements 17d are held in continuous contact with the associated running rollers 25d by means of the prestressing and/or damping devices 31 provided in the receiving depressions 35 which have been mentioned and, moreover, the outer running rollers 25c are held in continuous contact with the guiding surfaces.

Figure 4:
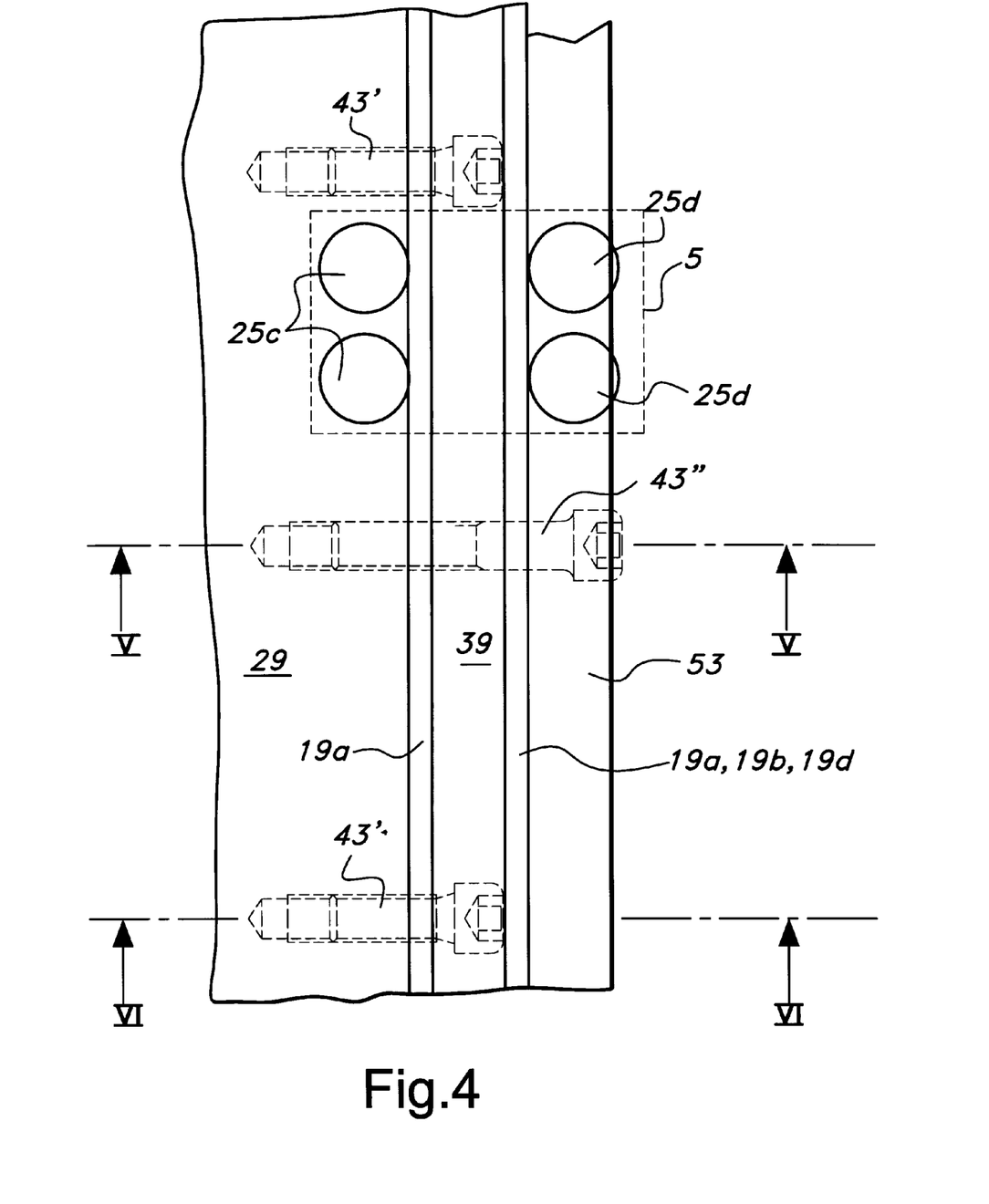
FIG. 4: shows a side representation of an excerpt of the guide rail according to the invention, with a tenter carriage which can be moved thereon.
Figure 5:
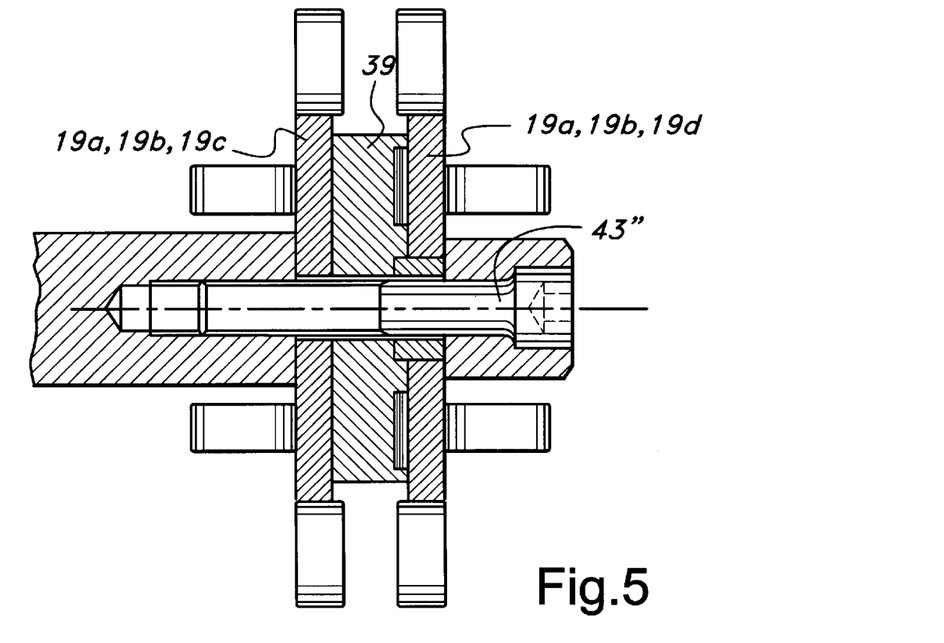
FIG. 5: shows a sectional representation on the line V—V in FIG. 4.
Figure 6:
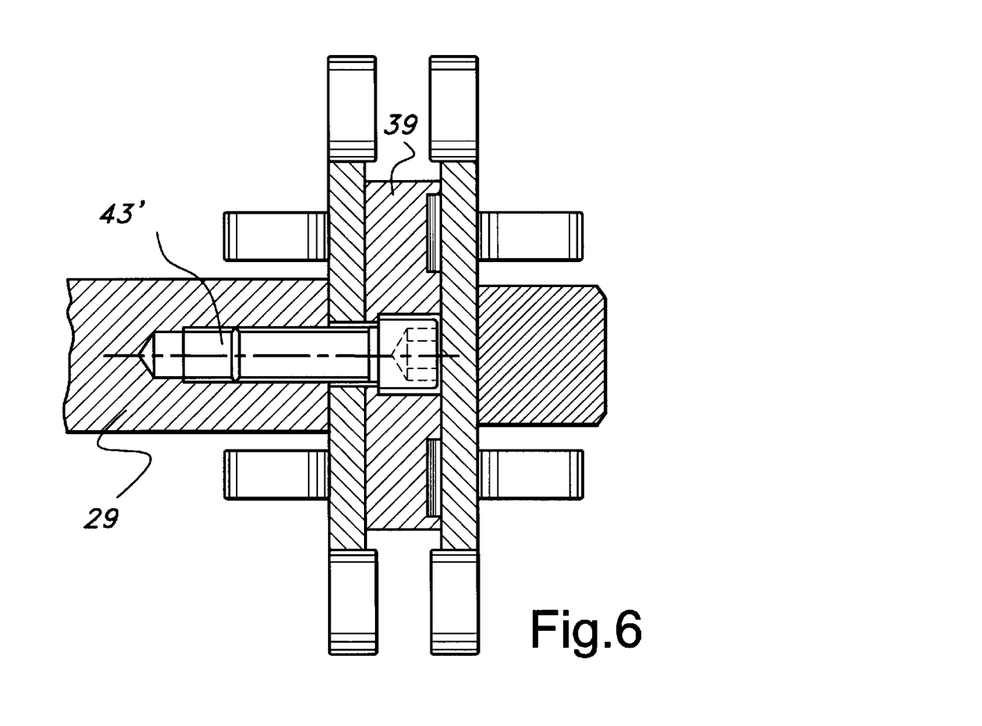
FIG. 6: shows a cross-sectional representation on the line VI—VI in FIG. 4.

A variation on the abovementioned exemplary embodiment is explained with reference to FIGS. 4 to 6, identical parts being denoted by identical reference symbols.

Here too, the guide rail is of sandwichlike construction, but beside the guide rail core 39 comprises only one outer and inner, relative to the material web, guide rail element 19c and 19d. In this exemplary embodiment too, only the guide rail element 19d situated on the material web side is of self-adjusting and automatically sprung design. The rail guide element 19d, the position of which is variable to a limited extent, in this case simultaneously represents the rail guide element 19a and 19b, respectively, for the upper and lower running rollers 25a, 25b, respectively. The rail guide element 19c likewise fulfills the function of the rail guide element 19a and 19b, respectively.

The design is such that, offset along the guide rail 3, the guide rail core 39 and, moreover, in a sandwichlike clamp fit, the rail-support side guiding surface element 17c is clamped firmly and precisely with respect to the rail support 29 via so-called inner screws 43'. To this end, corresponding bores are made in the rail guide element 19c.

Now furthermore, the rail guide rail element 19d situated on the material web side is also fastened and supported on the guide rail support 29 by means of so-called outer screws 43", likewise arranged offset in the longitudinal direction of the guide rail 3. The corresponding outer screws 43' in this case pass through correspondingly aligned bores in the guide rail core 39 and the rail guide element 19c situated behind it. These outer screws 43" are here in each case situated offset with respect to the inner screws 43", preferably in the center between two inner screws 43'.

The travel H for the automatically adjustable material-web side rail guide elements 19d is again likewise limited by the inner bushes 59 which are provided, through which the outer screws 43' pass.

Figure 7:
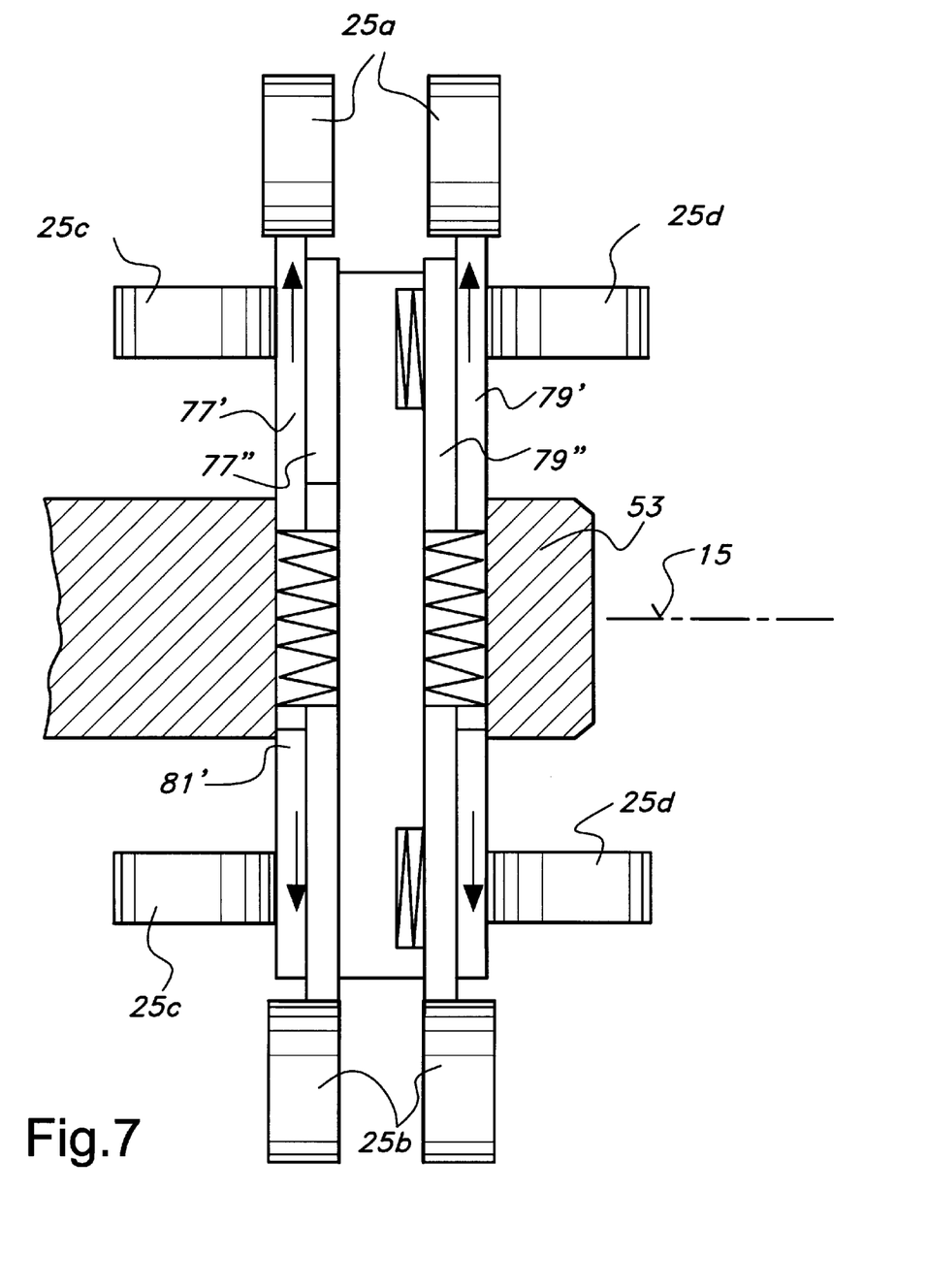
FIG. 7: shows a further modified exemplary embodiment in diagrammatic cross-sectional representation, transversely to the longitudinal direction of the guide rail.

Yet another modification is now shown with reference to FIG. 7, in which modification the top and bottom guiding surface elements 17a and 17b can also be automatically adapted to the corresponding running roller spacing by means of further prestressing and/or damping devices 31.

In this exemplary embodiment, the top and bottom rail guide elements 19a and 19b are divided in two, specifically into in each case two strip elements 77' and 77" and 79' and 79", respectively, which rest on top of one another in a conventional manner. They are aligned transversely with respect to the material web 15. The respectively outer strip elements 77' and 79' simultaneously form the rail guide elements 19c and 19d for the running rollers 25c and 25d which rotate about vertical axes.

These respectively interacting strip elements in each case have recesses 81' and 81", respectively, which are situated offset with respect to one another at intervals in the longitudinal direction of the guide rail, in which recesses prestressing and/or damping devices 31 which act in the vertical direction are provided.

The recesses 81' and 81" are arranged offset in the vertical direction (that is to say in the direction of action of the prestressing device 31), such that in each case the guide rail strip 77' and 77", respectively, is held with prestressing by means of the prestressing and/or damping device 31, the guiding surface of which guide rail strip is actually in contact with the running roller assigned to it. The arrangement and dimensions of the strip elements 77', 77" and 79', 79", respectively, and the associated recesses 81' and 81" are selected such that the common prestressing and/or damping device 31 is in each case supported on the inside of the strip element and is thus prestressed, which strip element forms the projecting rail guiding surfaces 17a and 17b, respectively, for the running rollers 25a, 25b situated at the top and bottom, respectively.

Due to the alternating support, and in a manner adapted to the actual running roller spacing between top and bottom running rollers, the in each case two interacting guide rail strips 77' and 77", respectively, and 79' and 79" may be automatically adjusted with respect to one another counter to the force of the prestressing device 31, or else also in the direction of the force of the prestressing device 31, such that the guiding surfaces 17*a* and 17*b* are held in continuous contact with the running rollers 25*a* and 25*b*.

In this exemplary embodiment too, an automatic adaptation, acting in the plane of the material web, of the material-web side guide rail elements 17*d* (which in this exemplary embodiment is formed by the guide rail strip 79') is furthermore provided, as was explained with regard to the previous exemplary embodiments. Despite the displaceability of the guide rail strips 79' and 79", respectively, situated on the material web side, the prestressing device 31 shown in FIG. 7 in this case enables an additionally automatic adaptation to the horizontal running rollers 25*c* and 25*d* to be achieved.

Figure 8:
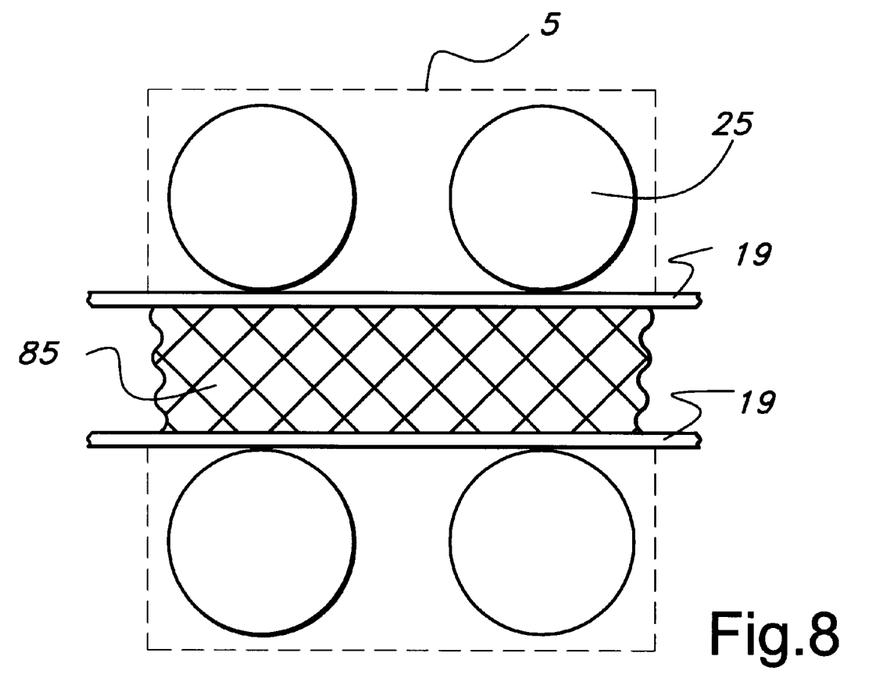
FIG. 8: shows a diagrammatic representation of an embodiment of a prestressing and/or damping device.
Figure 9:
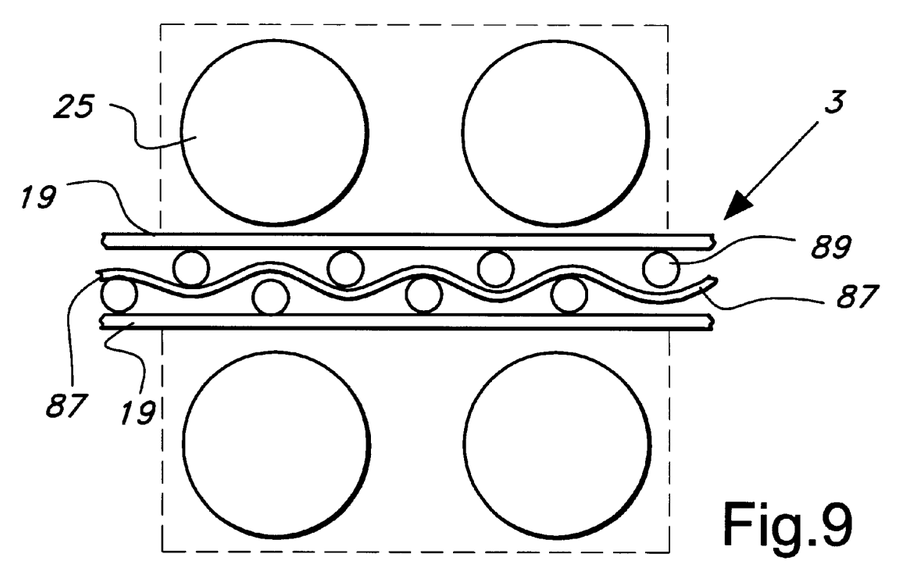
FIG. 9: shows a diagrammatic embodiment which is modified with respect to FIG. 8.

FIGS. 8 to 9 show, only diagrammatically, how the prestressing and/or damping devices 31 may be formed.

FIG. 8 diagrammatically depicts that the sprung, automatically adjustable rail guide elements 19 are held in a prestressed and damped manner by means of an elastomer 85 which is positioned and acts between them.

A leaf spring 87 arranged between the rail guide elements 19 is used in the exemplary embodiment in accordance with FIG. 9. In addition, thrust pieces 89, which can exhibit an additional damping property, are provided here positioned alternately with respect to the leaf spring.

Figure 10:
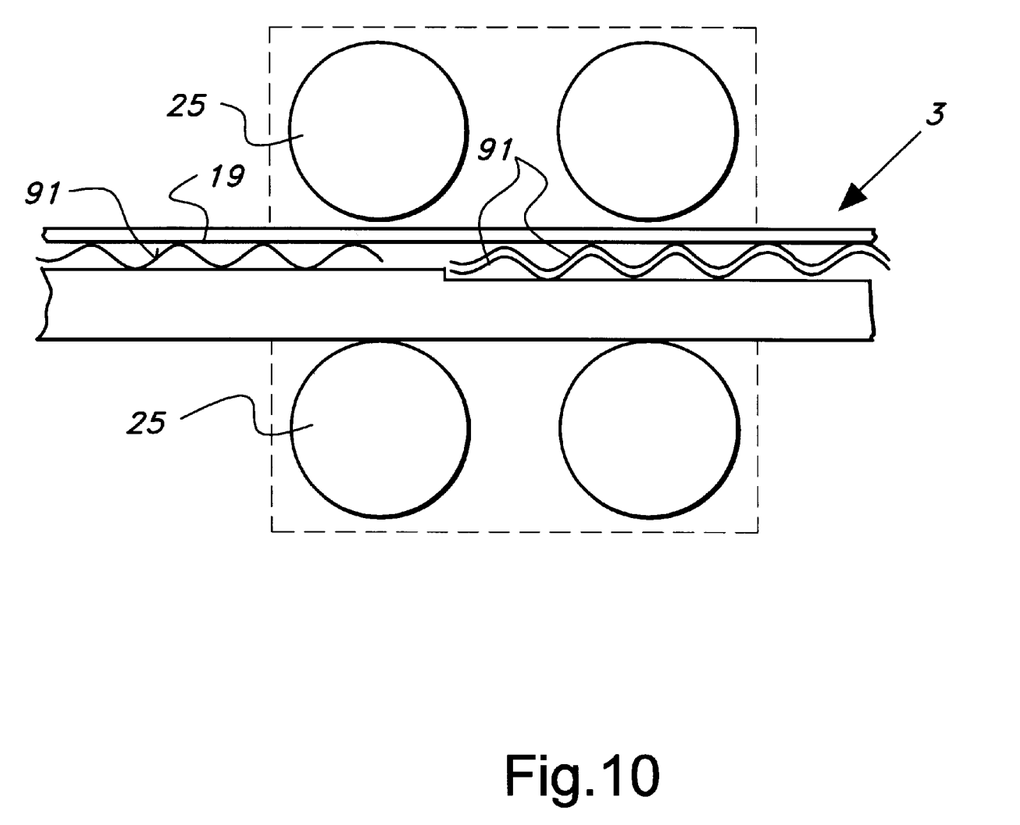
FIG. 10: shows a diagrammatic representation of another modified prestressing and damping device for a guide rail, with a variable running surface spacing.

In the exemplary embodiment in accordance with FIG. 10, a single zigzag spring 91 is shown on the left-hand side and a layered, i.e. double, zigzag spring 91 is shown on the right-hand side. However, further modifications are likewise possible.

We claim:

1. A transport device for a moving material web comprising:
   a guide rail arrangement including at least one guide rail having a pair of guide elements carrying respective rail surface sections oppositely oriented relative to one another;
   carriages supported by and mounted for movement along said one guide rail, each carriage having at least two guide members engaging respective rail surface sections enabling movement of said carriages along said one guide rail;
   at least one of said rail surface sections being mounted for movement relative to said guide rail to vary the spacing between rail surface sections; and
   first means carried by said guide rail for biasing said one surface section for movement relative to said oppositely oriented rail surface section to provide said variable spacing whereby said rail sections are maintained in substantially continuous contact with said guide members as said carriages are moved along said guide rail.

2. A transport device according to claim 1 wherein each of said rail surface sections is movable relative to said guide rail, second means carried by said guide rail for biasing another of said surface sections for movement relative to said one guide rail, said first and second means cooperating between said guide rail and said respective guide elements to bias said sections for movement in directions toward said carriage guide members.

3. A transport device according to claim 1 wherein said first means adjusts the spacing between said two rail surface sections to correspond to the spacing between said guide members of said carriages.

4. A transport device according to claim 1 wherein said one rail surface section lies facing the moving material web or opposite the moving material web.

5. A transport device according to claim 1 wherein said one rail surface section faces in a direction perpendicular to the moving material web.

6. A transport device according to claim 1 wherein said one rail surface section is carried by one of said guide elements for joint movement with said one rail surface section, said first means biasing said one guide element for said joint movement with said one rail surface section; and an inner stop carried by said one guide element for limiting movement of said one rail surface section in a direction opposite to the direction of the bias of said first means on said one guide element.

7. A transport device according to claim 1 wherein said one rail surface section is carried by one of said guide elements for joint movement with said one rail surface section, said first means biasing said one guide element for said joint movement with said one rail surface section; and an outer stop carried by said one guide element for limiting movement of said one rail surface section in the direction of the bias of said first means.

8. A transport device according to claim 2 wherein said rail guide sections face away from one another, said first and second means biasing said guide elements in opposite directions away from one another to maintain engagement of said rail surface sections with said guide members.

9. A transport device according to claim 8 wherein each said guide element comprises two guide rail strips disposed between oppositely aligned guide members, said strips partially overlapping one another and lying in parallel overlapping planes, said first and second biasing means displacing said strips in opposite directions.

10. A transport device according to claim 1 wherein said biasing means comprises one of leaf springs, coil springs, disk springs, flexible limb springs, torsion springs or zigzag springs.

11. A transport device according to claim 1 wherein at least one of said guide elements includes at least two running surfaces disposed at an angle to one another and on which differently aligned guide members are supported for longitudinal movement.

12. A transport device according to claim 1 wherein said guide rail comprises a monorail.

13. A transport device for a moving material web comprising:
   a guide rail arrangement including at least one guide rail having a pair of guide elements carrying respective rail surface sections oppositely oriented relative to one another;
   carriages supported by and mounted for movement along said one guide rail, each carriage having at least two guide members engaging respective rail surface sections enabling movement of said carriages along said one guide rail;
   at least one of said rail surface sections being mounted for movement relative to said guide rail to vary the spacing between rail surface sections; and
   first means carried by said guide rail for damping the movement of said one surface section relative to said one guide rail thereby to maintain said rail sections in substantially continuous contact with said guide members as said carriages are moved along said guide rail.

14. A transport device according to claim 13 wherein each of said rail surface sections is movable relative to said guide rail, second means carried by said guide rail for damping the movement of another of said surface sections relative to said one guide rail, said first and second means cooperating between said guide rail and said respective guide elements to damp the movement of said sections.

15. A transport device according to claim 13 wherein said first means adjusts the spacing between said two rail surface sections to correspond to the spacing between said guide members of said carriages.

16. A transport device according to claim 13 wherein said one rail surface section lies facing the moving material web or opposite the moving material web.

17. A transport device according to claim 13 wherein said one rail surface section faces in a direction perpendicular to the moving material web.

18. A transport device according to claim 13 wherein each said guide element comprises two guide rail strips disposed between oppositely aligned guide members and movable in opposite directions, said strips partially overlapping one another and lying in parallel overlapping planes, said first and second damping means displacing said strips in opposite directions.

19. A transport device according to claim 13 wherein at least one of said guide elements includes at least two running surfaces disposed at an angle to one another and on which differently aligned guide members are supported for longitudinal movement.

20. A transport device according to claim 13 wherein said guide rail comprises a monorail.

21. A transport device for a moving material web comprising:

a guide rail arrangement including at least one guide rail having a pair of rail surface sections oppositely oriented relative to one another;

carriages supported by and mounted for movement along said one guide rail, each carriage having at least two guide members engaging respective rail surface sections enabling movement of said carriages along said one guide rail;

at least one of said rail surface sections being mounted for movement relative to said guide rail to vary the spacing between rail surface sections; and first means carried by said guide rail for elastic movement of said one surface section relative to said oppositely oriented rail surface section to provide said variable spacing whereby said rail sections are maintained in substantially continuous contact with said guide members as said carriages are moved along said guide rail.

* * * * *